INVENTOR.
F. L. LeBus, Sr.

May 6, 1958   F. L. LE BUS, SR   2,833,018
PIVOTAL HOOK MEMBER

Filed July 6, 1954   2 Sheets-Sheet 2

INVENTOR.
BY  F. L. LeBus, Sr.

ATTORNEY

United States Patent Office 2,833,018
Patented May 6, 1958

2,833,018

PIVOTAL HOOK MEMBER

Franklin L. Le Bus, Sr., Longview, Tex.

Application July 6, 1954, Serial No. 441,475

5 Claims. (Cl. 24—241)

This invention relates to clevis hooks and more particularly, but not by way of limitation, to safety clevis hooks to be utilized with ordinary snatch blocks or pulleys.

The present invention contemplates an improved clevis hook to be utilized with any ordinary snatch block or pulley, and the construction of the novel clevis hook provides a swivel action of the hook body as well as the hooking portion so that the clevis hook will be free to rotate or pivot independently of the snatch block. The new clevis hook is also designed so that the hook body may be made rigid to eliminate the hinge action of the body without affecting the pivotal qualities of the hooking portion. Thus the present invention may be utilized with any conventional snatch block or pulley block.

It is an important object of this invention to provide a free swiveling clevis hook for use with any snatch block or pulley.

It is another object of this invention to provide a clevis hook for use with a snatch block and having a swivel body member and pivotal hooking portion for movement independently of the snatch block.

And still another object of this invention is to provide a clevis hook for use with a snatch block and having a body member that may be rigid or rotatable without interfering with the pivotal action of the hooking portion.

It is a further object of this invention to provide a safety clevis hook having a latching mechanism to secure the hooking portion when in a closed position.

A still further object of this invention is to provide a safety clevis hook designed for simplicity of operation and economy in construction.

Other objects and advantages of the invention will be evident from the following detailed description, read in conjunction with the accompanying drawings, which illustrate my invention.

Figures 1, 4:
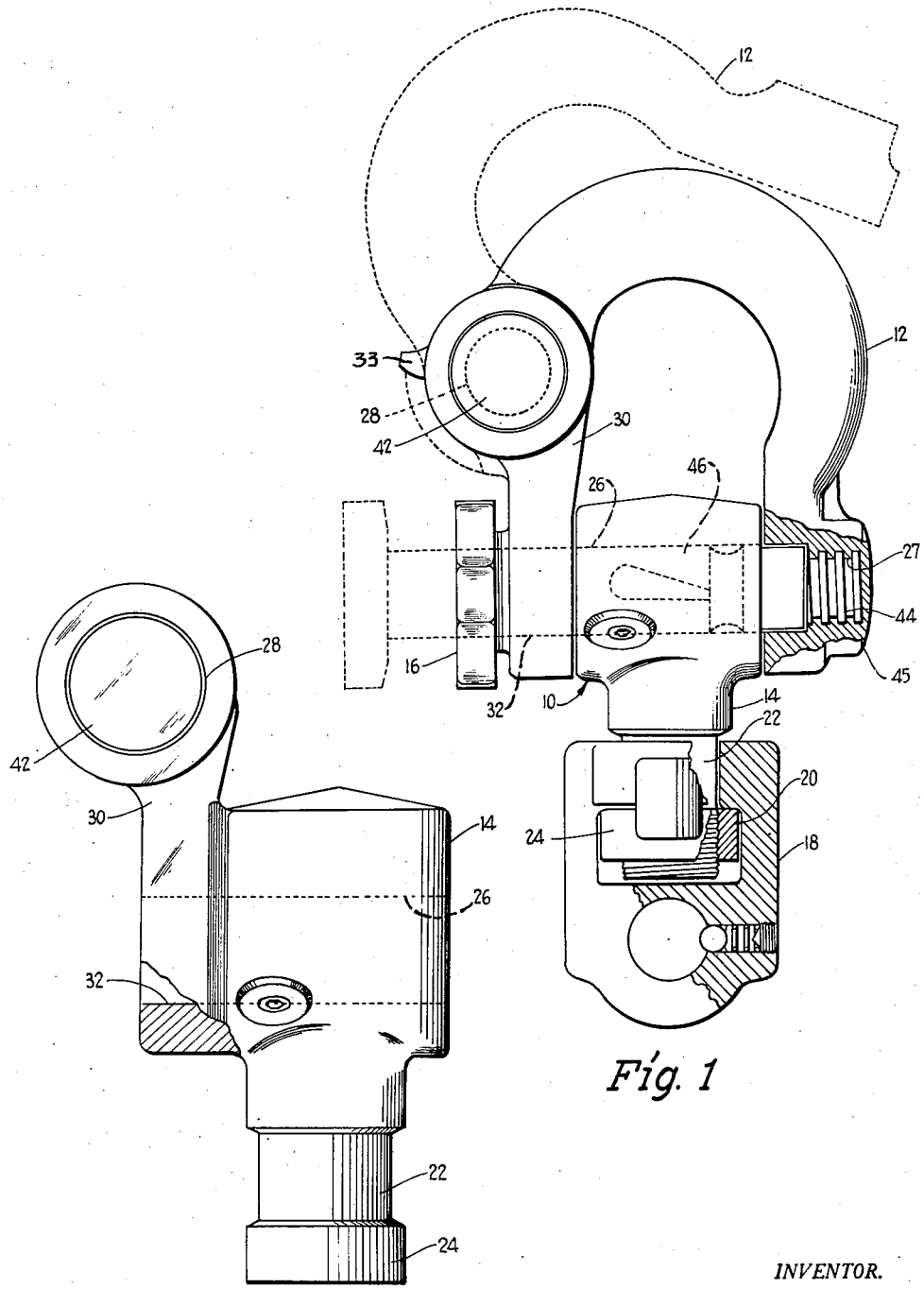
Figure 1 is a side elevational view of the novel clevis hook embodying the invention with certain portions depicted in cross section for clarity.
Figure 4 is a portion of a clevis hook embodying the invention and depicting the hook body section in a rigid position.
Figures 2, 3:
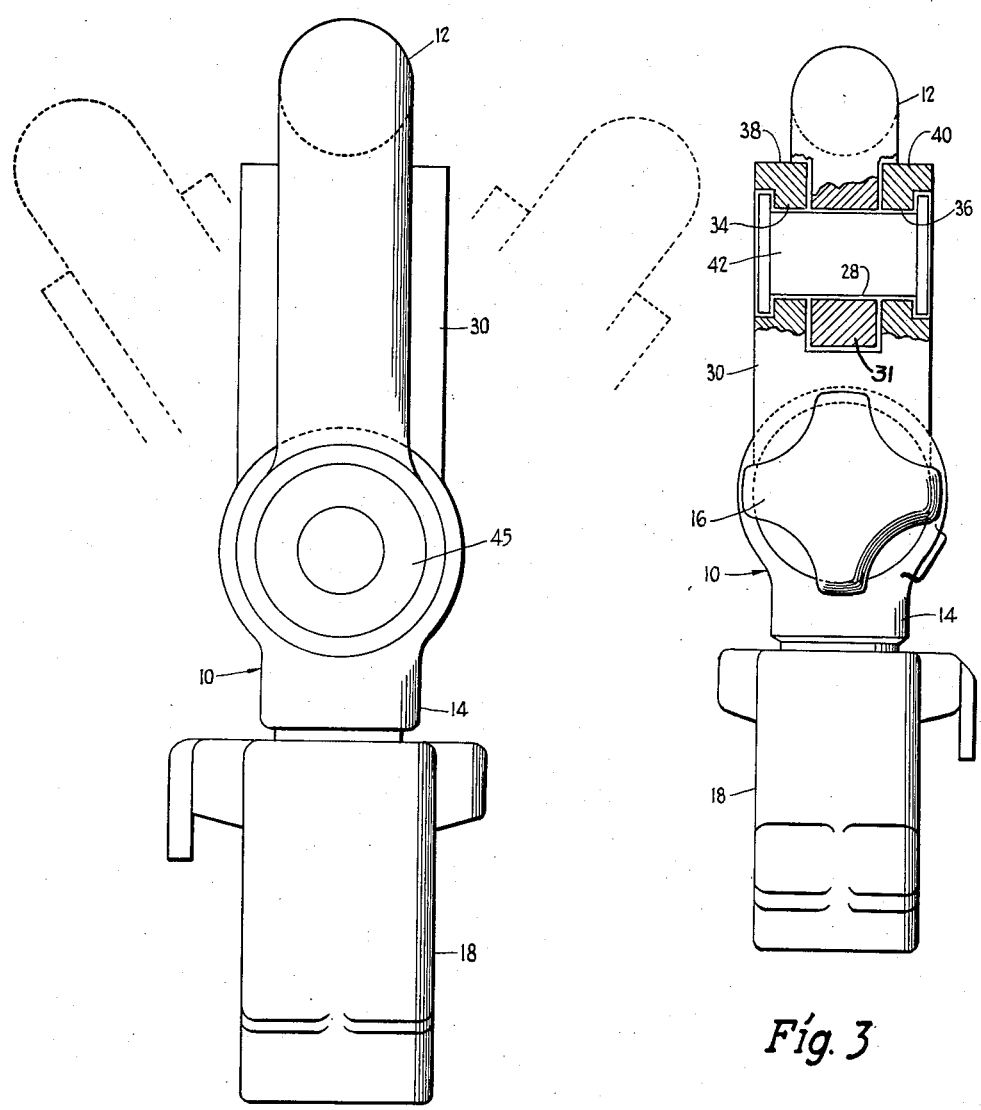
Figure 2 is a front elevational view of a clevis hook embodying the invention and variable positions of the hook in dotted lines.
Figure 3 is a back elevational view of a clevis hook embodying the invention with certain parts in cross section for clarification.

Referring to the drawings in detail, reference character 10 represents a clevis hook in general comprising a hooking member 12, a swivel body portion 14 and a blocking bolt 16. A body member 18, normally utilized with a snatch block or pulley (not shown), cooperates with a threaded portion 20 disposed at the lower end of a stud 22, extending downwardly from the swivel body portion 14, and connecting with a nut 24 to secure the clevis hook 10 to the snatch block. The swivel body portion 14 is provided with an aperture or bore 26 for receiving the blocking bolt 16 extending therethrough. The hooking member 12 is substantially U-shaped and is provided with a threaded recess 27 at one end thereof, and an aperture 28 at the opposite end thereof. A yoke member 30 is provided with an aperture 32 (Fig. 1) at its lower end for alignment with the aperture 26 of the swivel body portion 14. Aligned apertures 34 and 36 are provided through prongs 38 and 40 respectively of the yoke 30 for alignment with the aperture 28 of the hooking member 12. A shaft or hinge pin 42 is freely journaled in the bore created by the alignment of the apertures 34, 36 and 28, and thereby forms a hinge for the pivotal movement of the hook 12 as it is moved from a closed position as shown in solid lines (Fig. 1) to an open position as indicated by the dotted lines (Fig. 1). The apertured end 31 (Fig. 3) of the hooking member 12 terminates in a suitable stop or lug 33 (Fig. 1) provided for the purpose of stopping or limiting the opening movement of the hook.

The aperture 32 aligns with the aperture 26 to permit the blocking bolt 16 to be disposed therethrough. It will be apparent that the threads 44 of the bolt 16 will mate with the threaded recess 27 provided on end 45 of the hook member 12 when the hook is in a closed position, thereby holding the hook securely from any accidental opening. The shank 46 of the bolt 16 will serve as an axis of rotation when the threads 44 are fully engaged, and permit the hook member 12 and the yoke member 30 to move freely about this axis as a unit (as shown by dotted lines in Fig. 2). The movement is at least ninety degrees off center in either direction from the vertical. When the threads 44 are disengaged by retrograde movement of the bolt 16, the hook member 12 will be free to rotate about the hinge pin 42 to an open position.

It is often found that the hinge or pivotal action of the hooking member 12 about the stud 46 is not necessary, particularly when the body portion 18 of a cooperating snatch block or pulley used therewith has a hinge action. In such instances, the yoke member 30 may be welded or otherwise secured in any suitable manner to the swivel body portion 14, thereby making a single, rigid member as shown in Fig. 4. The hook member 12 nevertheless will still be free to open and close about its pivot in the manner as hereinbefore described, but may not pivot about the stud 46 of the bolt 16.

From the foregoing, it will be apparent that the present invention provides a safety clevis that may be opened into a hook for use with any ordinary snatch block or pulley, thereby substantially eliminating the necessity of using a pair of snatch blocks having separate clevis or hook members.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a hook structure comprising a body member, a swivel member disposed in the body member, said swivel member provided with an aperture, a blocking bolt disposed in the aperture, a yoke member journaled on the bolt, a substantially U-shaped hook member having one end journaled in the yoke member, said opposite end of the hook member having a threaded recess for engagement with one end of the blocking bolt, and means in the yoke member permitting free pivotal movement of the hook member upon disengagement from the bolt.

2. In a hook structure comprising a body member, a swivel member disposed in the body member, said swivel member provided with an aperture, a blocking bolt disposed in the aperture, a yoke member freely journaled on the bolt and extending upwardly therefrom, a substantially U-shaped hook member having one end journaled to the upper end of the yoke member, said opposite end of the hook member having a threaded recess for engagement with the threaded end of the blocking bolt, and a freely journaled shaft mounted on the yoke member permitting pivotal movement of the hook member upon disengagement from the threaded end of the bolt.

3. In combination with a snatch block and an apertured swivel body therefor, a bolt disposed in the apertured body, a yoke member loosely journaled on the bolt and having an extension disposed upwardly therefrom, and a hook member having one end loosely journaled to the yoke extension, said hook member having an opposite end engageable in one position of the hook with the blocking bolt, said hook member capable of alternate pivotal action in at least two different planes disposed perpendicular to each other.

4. In combination with a snatch block and an apertured swivel body therefor, a bolt disposed in the apertured body, a yoke member loosely journaled on the bolt and having an extension disposed upwardly therefrom, a substantially U-shaped hook member having one end journaled in the yoke member, and a pin carried by the yoke member providing pivotal movement of the hook member, said hook member having an opposite end provided with a threaded recess for engagement with the threaded end of the blocking bolt, said yoke member cooperating with the hook member to provide alternate pivotal action of the hook member in at least two different planes disposed perpendicular to each other.

5. In a hook structure for use with a snatch block having a swivel body member therewith, said swivel member provided with an aperture, a bolt disposed through the aperture, a yoke journaled on the bolt, a U-shaped hook member having one end loosely journaled in the yoke member, the opposite end of the hook member having a threaded recess engaging the threaded end of the bolt providing a clevis for the hook member in locked position, and means in the yoke member permitting free pivotal movement of the hook member upon disengagement from the bolt providing a hook therefor.

References Cited in the file of this patent

UNITED STATES PATENTS

| 557,601 | Petermann | Apr. 7, 1896 |
| 967,141 | Merriman | Aug. 9, 1910 |
| 1,252,222 | Bever | Jan. 1, 1918 |

FOREIGN PATENTS

| 171,699 | Germany | June 13, 1896 |